United States Patent
Sugiyama (10) Patent No.: US 8,514,384 B2
(45) Date of Patent: Aug. 20, 2013

(54) ALIGNMENT METHOD FOR AN IMAGE READING APPARATUS

(75) Inventor: Takayuki Sugiyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 217 days.

(21) Appl. No.: 13/108,520

(22) Filed: May 16, 2011

(65) Prior Publication Data

US 2011/0279813 A1    Nov. 17, 2011

(30) Foreign Application Priority Data

May 17, 2010   (JP) ................................. 2010-113170

(51) Int. Cl.
*G01B 11/26*      (2006.01)
*H04N 1/04*      (2006.01)

(52) U.S. Cl.
USPC ........................................... 356/138; 358/497

(58) Field of Classification Search
USPC ................. 356/138; 358/497, 474, 475
See application file for complete search history.

(56) References Cited

U.S. PATENT DOCUMENTS

| | | | | |
|---|---|---|---|---|
| 6,801,375 B2 * | 10/2004 | Hayashide | ..................... | 359/819 |
| 7,505,184 B2 * | 3/2009 | Hayashide | ..................... | 358/497 |
| 7,688,529 B2 * | 3/2010 | Hayashide et al. | ........... | 359/811 |

FOREIGN PATENT DOCUMENTS

| | | |
|---|---|---|
| JP | 2000-171705 A | 6/2000 |
| JP | 2005-101739 A | 4/2005 |

* cited by examiner

*Primary Examiner* — Layla Lauchman
(74) *Attorney, Agent, or Firm* — Rossi, Kimms & McDowell LLP (57) ABSTRACT

Provided is an alignment method for an image reading apparatus including: a light source unit illuminating an original on an original table; a photoelectric conversion element for converting an optical image into an electric signal; and an imaging optical system for imaging, onto the photoelectric conversion element, a light beam from the illuminated original. The imaging optical system includes: a first optical element, arranged inside a first lens barrel, and having an optical surface that is rotationally symmetric about an optical axis; and a second optical element, arranged on an optical path between the first lens barrel and the photoelectric conversion element, and having an optical surface rotationally asymmetric about the optical axis. The alignment method includes aligning at least one of an attaching angle and an attaching position of the second optical element in a sub scanning direction relative to the first lens barrel.

7 Claims, 6 Drawing Sheets

ALIGNMENT METHOD FOR AN IMAGE READING APPARATUS

BACKGROUND OF THE INVENTION

1. Field of the Invention

The present invention relates to an alignment method for an image reading apparatus for reading image information of an original placed on an original table. In particular, the present invention is suitable for image reading apparatus such as an image scanner, a copying machine, and a facsimile machine, which are capable of high-precision image reading by fully utilizing the optical performance of an imaging optical system having a rotationally asymmetric lens such as an anamorphic lens.

2. Description of the Related Art

Up to now, as apparatus for reading image information of an original placed on an original table, image reading apparatus such as an image scanner and a digital copying machine are known. Of the image reading apparatus, there is known a flatbed type image scanner using an integrated scanning optical unit (carriage-integrated unit) in which an imaging optical system for image reading and a reading unit are housed in a case (carriage).

In this image reading apparatus, the original placed on the original table is illuminated directly or via a reflector with a light beam emitted from an illumination light source. An optical path of the light beam reflected on the original is bent in an inner portion of the carriage through a plurality of reflection mirrors. The image information of the original is imaged by the imaging optical system on a surface of a linear image sensor (hereinafter referred to as "CCD sensor" or "CMOS sensor") in which reading pixels are arranged in a main scanning direction. The carriage is moved in a sub scanning direction by a sub scanning motor to read the image information of the original. The image information thus read is sent to an external device, for example, a personal computer via an interface.

In recent years, the image reading apparatus having the structure described above is desired to be reduced in size. In order to achieve the reduction in size, it is important to reduce the size of the carriage. In order to reduce the size of the carriage, for example, there are a method of increasing the number of reflection mirrors and a method of performing a plurality of reflections using a single reflection mirror to ensure an optical path length. In addition to this, in recent years, there is proposed an image reading apparatus in which the anamorphic lens having at least one surface with a rotationally asymmetric shape about an optical axis is introduced into the imaging optical system (see Japanese Patent Application Laid-Open No. 2000-171705). In the case of the image reading apparatus, a view angle of the imaging optical system is widened to reduce an object-to-image distance, to thereby shorten the optical path length and reduce the overall size of the apparatus.

When the anamorphic lens is used for the imaging optical system as described above, an image field curvature aberration may be effectively reduced, and hence image information with an excellent contrast may be obtained. However, in the imaging optical system including the anamorphic lens in a rotationally asymmetric shape, the imaging area is also rotationally asymmetric. Particularly in the imaging optical system designed to attain a widened view angle, priority is given to the imaging performance in the main scanning area, which is wide in reading range.

Therefore, the main scanning area has a high resolution over a wide range. In the sub scanning direction, on the other hand, aggravated aberration lowers the resolution, thus narrowing the range of the high resolution. In addition, the carriage-integrated image reading apparatus has many components, and the carriage is in many cases manufactured by resin molding for manufacturing reasons. In general, it is difficult to maintain high positional accuracy for the parts due to a great variation in molding accuracy. For example, if the components such as mirrors are displaced in the sub scanning section, the resolution in the sub scanning direction degrades. In view of the above, there is proposed an alignment method for suppressing the reduction in resolution by aligning the angles of the mirrors in the sub scanning direction and aligning the imaging optical system and the reading unit integrally (see Japanese Patent Application Laid-Open No. 2005-101739).

In the alignment method for an image reading apparatus disclosed in Japanese Patent Application Laid-Open No. 2005-101739, the angles of the mirrors in the sub scanning section are aligned. In this method, when the carriage is downsized to reduce the widths of the mirrors in the sub scanning direction, the sensitivity of the angle alignment tends to be extremely high because the mirrors are reflection members, and hence the alignment is difficult. Further, the imaging optical system is constituted by a rotationally symmetric lens arranged inside a lens barrel and a rotationally asymmetric lens arranged outside the lens barrel. Therefore, if there is a backlash component between the lens barrel and the rotationally asymmetric lens, the rotationally asymmetric lens may be displaced in the sub scanning direction relative to the rotationally symmetric lens inside the lens barrel. At this time, in the method in which the imaging optical system and the reading unit are aligned integrally, it is difficult to perform alignment for contrast degradation due to the displacement in the sub scanning direction, which occurs in the imaging optical system.

SUMMARY OF THE INVENTION

It is an object of the invention to provide an alignment method for an imaging optical system, which allows image information to be read with high accuracy in an imaging optical system using a rotationally asymmetric lens through effective alignment for displacement of the rotationally asymmetric lens in a sub scanning direction, and to also provide an image reading apparatus using the alignment method.

In order to achieve the above-mentioned object, the present invention provides an alignment method for an image reading apparatus including: a light source unit, which emits a light beam for illuminating an original placed on an original table; a photoelectric conversion element, in which a plurality of reading pixels are arrayed in a main scanning direction so as to convert an optical image into an electric signal; and an imaging optical system for imaging, onto the photoelectric conversion element, the light beam from the original that is illuminated by the light beam emitted from the light source unit. The imaging optical system includes: a first optical element, which is arranged inside a first lens barrel, and has an optical surface that is rotationally symmetric about an optical axis; and a second optical element, which is arranged on an optical path between the first lens barrel and the photoelectric conversion element, and has an optical surface that is rotationally asymmetric about the optical axis. The alignment method includes an alignment step of aligning at least one of an attaching angle and an attaching position of the second optical element in a sub scanning direction relative to the first lens barrel.

In the above-mentioned alignment method for an image reading apparatus, it is preferred that the alignment step include: a reference step of moving the photoelectric conversion element to a plurality of positions in the sub scanning direction, and referring to contrast values of image information of the original obtained by the photoelectric conversion element at the plurality of positions; a first calculation step of calculating a shift amount of the photoelectric conversion element in the sub scanning direction from a maximum reference value selected from among the contrast values obtained at the plurality of positions; a second calculation step of calculating at least one of an alignment angle and an alignment shift amount of the second optical element in the sub scanning direction from the shift amount of the photoelectric conversion element; and an attachment step of aligning the at least one of the attaching angle and the attaching position of the second optical element in the sub scanning direction relative to the first lens barrel based on the at least one of the alignment angle and the alignment shift amount of the second optical element in the sub scanning direction.

Alternatively, it is preferred that the reference step of moving the photoelectric conversion element to a plurality of positions in the sub scanning direction, and referring to contrast values of image information of the original obtained by the photoelectric conversion element at the plurality of positions include moving the photoelectric conversion element to at least three positions on a sub scanning section, which are an optical central position of the imaging optical system, one side position with respect to the optical central position of the imaging optical system, and another side position with respect to the optical central position of the imaging optical system.

Alternatively, it is preferred that the alignment method for an image reading apparatus further include reading image information of the original by moving, in the sub scanning direction, an integrated scanning optical system unit including a carriage, which houses the light source unit, the photoelectric conversion element, and the imaging optical system.

Alternatively, it is preferred that the alignment step include an attachment step of aligning at least one of an attaching angle and an attaching position of a second lens barrel, which holds the second optical element, in the sub scanning direction relative to the first lens barrel.

In addition, it is preferred that the alignment step include an attachment step of aligning at least one of an attaching angle and an attaching position of the integrated scanning optical system unit in the sub scanning direction relative to the image reading apparatus.

Further, the present invention encompasses an image reading apparatus, which is subjected to alignment using the above-mentioned alignment method for an image reading apparatus.

According to the present invention, it is possible to obtain an alignment method for an imaging optical system, which allows image information to be read with high accuracy in an imaging optical system using a rotationally asymmetric lens through effective alignment for displacement of the rotationally asymmetric lens in a sub scanning direction.

Further features of the present invention will become apparent from the following description of exemplary embodiments with reference to the attached drawings.

DESCRIPTION OF THE EMBODIMENTS

According to the present invention, an image reading apparatus including an imaging optical system includes a light source unit 3 that emits a light beam for illuminating an original 1 placed on an original table 2. The image reading apparatus further includes a plurality of mirrors 4a to 4e for reflecting the light beam from the original 1 that is illuminated by the light beam from the light source unit 3, and an imaging optical system 5 including an optical element 5d having an optical surface that is rotationally asymmetric about an optical axis, the imaging optical system 5 imaging image information of the original 1 by using the light beam reflected by the plurality of mirrors. In addition, the image reading apparatus includes a photoelectric conversion element (reading unit) 6, in which a plurality of reading pixels are arrayed in a main scanning direction so as to convert an optical image formed by the imaging optical system 5 into an electric signal. Those components are housed in a carriage to constitute an integrated scanning optical system 7. The integrated scanning optical system unit 7 is moved in a sub scanning direction to read the image information of the original 1.

Figure 1:
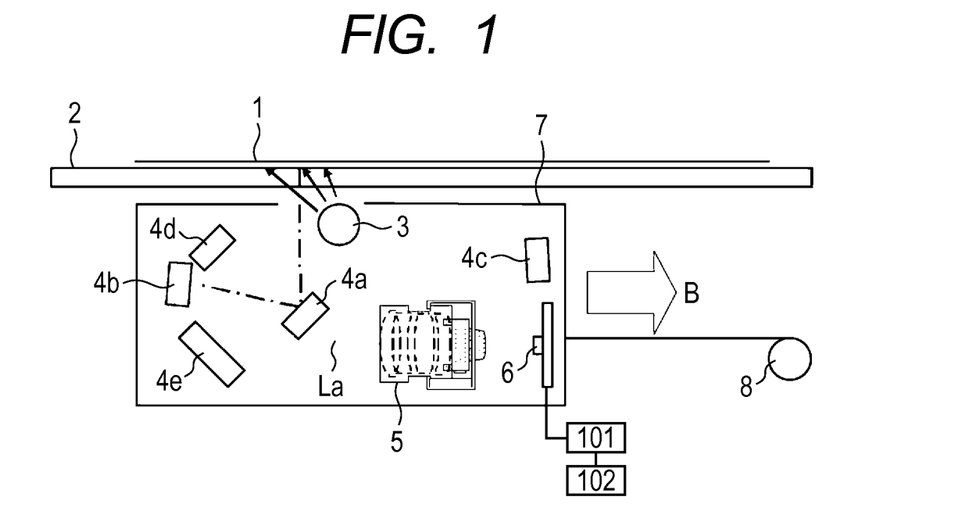
FIG. 1 is a main portion schematic diagram of an image reading apparatus according to a first embodiment of the present invention.

FIG. 1 is a main portion schematic diagram of the image reading apparatus such as an image scanner or a copying machine, to which an alignment method for an image reading apparatus according to a first embodiment of the present invention is applied. In FIG. 1, the original 1 is placed on the surface of the original table glass 2 for image reading. The carriage (integrated scanning optical unit) 7 integrally houses the illumination system (light source unit) 3, the plurality of reflection mirrors 4a, 4b, 4c, 4d, and 4e, the imaging optical system 5, and the reading unit (photoelectric conversion element) 6, which are described later. The carriage 7 is driven in the sub scanning direction (arrow B direction) by a sub scanning mechanism 8 such as a motor to read the image information of the original 1 two-dimensionally. The illumination system 3 is constituted by, for example, a xenon flash tube, a halogen lamp, or an LED array. The illumination system 3 may be used in combination with a reflection plate such as an aluminized plate. The first, second, third, fourth, and fifth reflection mirrors 4a, 4b, 4c, 4d, and 4e bend an optical path of the light beam from the original 1 in the carriage 7.

Figure 2:
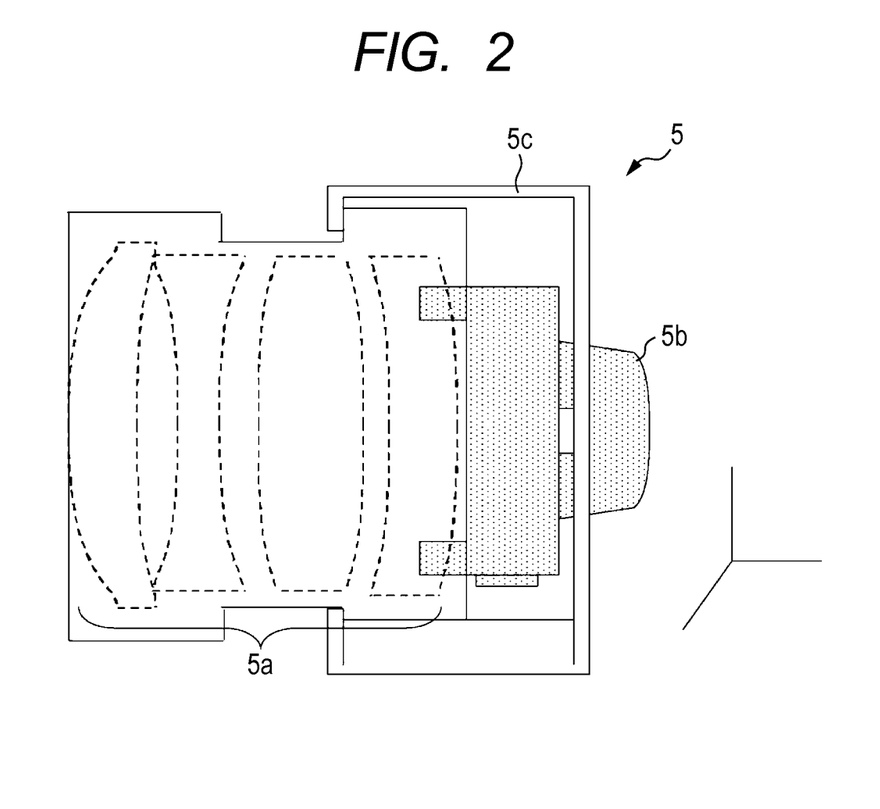
FIG. 2 is a main portion schematic diagram of an imaging optical system of FIG. 1.

The imaging optical system 5 images the light beam based on the image information of the original 1 onto the surface of the reading unit 6. Referring to FIG. 2, the imaging optical system 5 includes a lens 5a having a rotationally symmetric optical surface, which is arranged in an inner portion of a lens barrel 5c (inside a lens barrel), and an anamorphic lens (rotationally asymmetric lens) 5b having a rotationally asymmetric optical surface. The reading unit 6 is constituted by so-called three monolithic line sensors, in which three line sensors (CCD sensors or CMOS sensors) are arranged in parallel to the one-dimensional direction (main scanning direction) (direction perpendicular to the drawing sheet). On the surfaces of the three line sensors, color filters (not shown) based on the respective color light beams (red (R), green (G), and blue (B)) are provided, respectively. The three line sensors sequentially read different pieces of color information (R, G, and B) on the original 1.

In this embodiment, the light beam emitted from the illumination system 3 illuminates the original 1 in an illumination range that is wide in the main scanning direction directly or via a reflector (not shown). Then, the optical path of the light beam reflected on the original 1 is sequentially bent via the first, second, third, fourth, and fifth reflection mirrors 4a, 4b, 4c, 4d, and 4e in the carriage 7, and the imaging optical system 5 images the image information of the original 1 onto the surface of the line sensor. Then, the carriage 7 is moved in the sub scanning direction (arrow B direction) by the sub scanning mechanism 8 to read the image information of the original 1 two-dimensionally. Then, the image information thus read is sent to a personal computer (PC) 102 or a printer being an external device via an interface 101.

First Embodiment

Figure 3A:
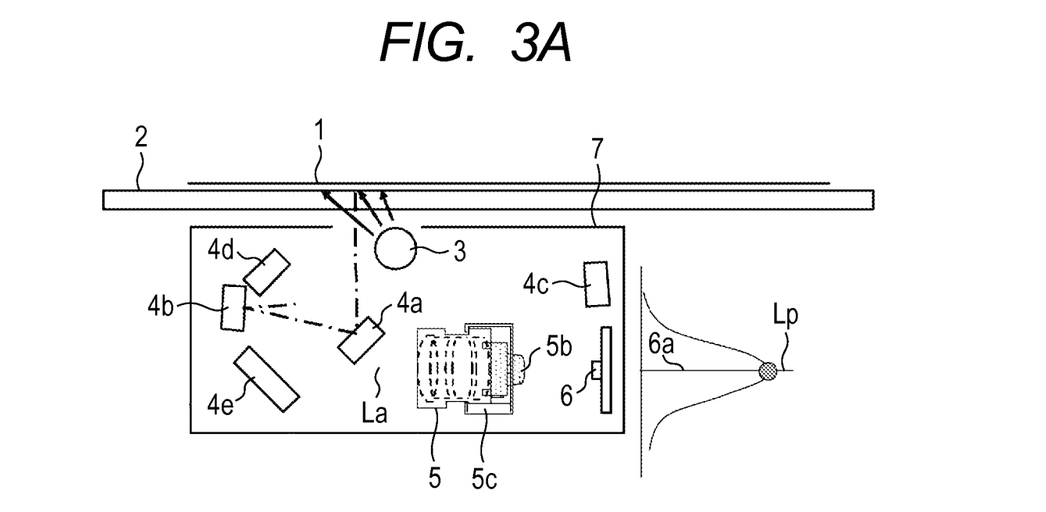
FIGS. 3A and 3B are main portion schematic diagrams and contrast characteristic graphs of the image reading apparatus before alignment.
Figure 3B:
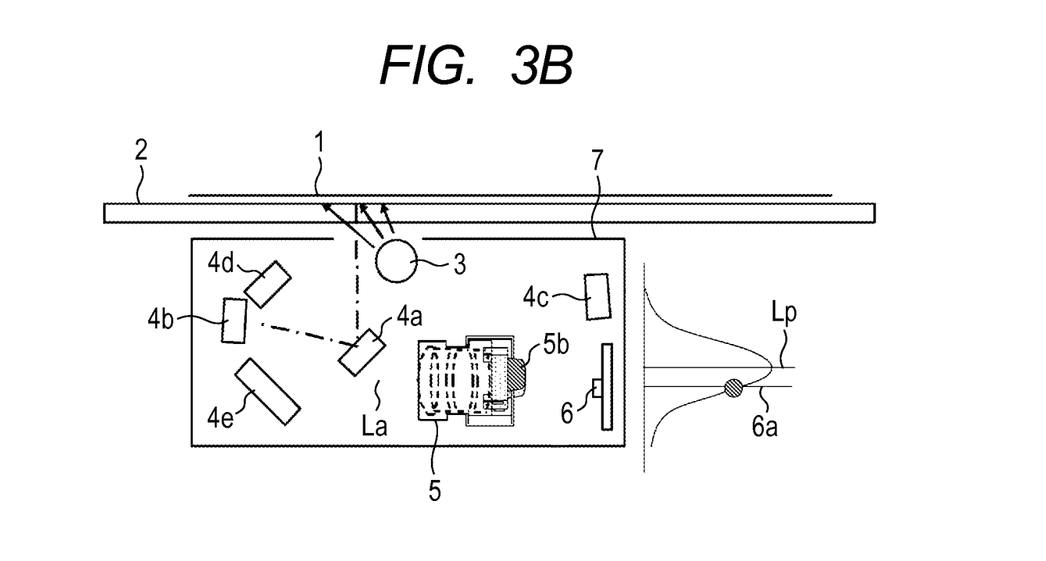

FIGS. 3A and 3B are main portion schematic diagrams of the image reading apparatus and contrast characteristic graphs on the surface of the reading unit 6 thereof before alignment, to which the alignment method for an image reading apparatus according to this embodiment is applied. In FIGS. 3A and 3B, similarly to FIG. 1, the image information of the original 1 is imaged onto the reading unit 6. FIG. 3A illustrates a reading optical path in an ideal case where the components are attached at predetermined positions at the time of imaging.

A center (ray on an optical axis La) Lp of the optical path at this time is imaged correctly onto a center 6a of the reading unit 6, and hence the resolution for image reading is high. Referring to FIG. 2, however, the anamorphic lens (rotationally asymmetric lens) 5b of the imaging optical system 5 is arranged outside the lens barrel 5c in the optical axis direction. Therefore, there may occur a fitting backlash between the anamorphic lens 5b and the lens barrel 5c in a direction perpendicular to the optical axis La (sub scanning direction). FIG. 3B is an explanatory diagram illustrating the case of the fitting backlash, that is, the case where the anamorphic lens 5b is displaced in the sub scanning direction. Regarding the imaging performance in the sub scanning direction in this case, astigmatism in a direction of 45 degrees is aggravated, and hence the center Lp of the reading optical path is not imaged onto the center 6a of the surface of the line sensor 6, with the result that the resolution for image reading is lowered.

Figure 4:
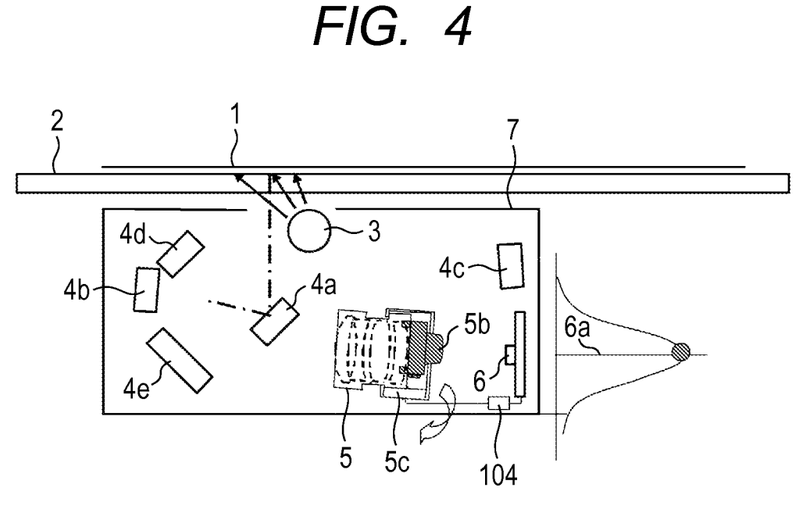
FIG. 4 is a main portion schematic diagram and a contrast characteristic graph of the image reading apparatus after alignment according to the first embodiment of the present invention.

In view of the above, in the first embodiment, an attaching angle of the imaging optical system 5 in the sub scanning direction is aligned, to thereby shift the position of the anamorphic lens 5b through which the ray of the reading optical path passes as illustrated in FIG. 4. Then, correction is performed for the aggravation amount of the astigmatism in the direction of 45 degrees, and accordingly the center Lp of the reading optical path is imaged onto the center 6a of the surface of the line sensor 6. In this manner, excellent image reading is realized.

Next, steps of the alignment method for the imaging optical system 5 according to this embodiment is described. The alignment method of this embodiment includes an alignment step of aligning, by using an alignment unit, at least one of the attaching angle and the attaching position of the imaging optical system 5 in the sub scanning direction. The alignment step performed by using the alignment unit includes a reference step of moving the photoelectric conversion element 6 to a plurality of positions in the sub scanning direction, and referring to contrast values of the image information of the original obtained by the photoelectric conversion element 6 at the plurality of positions. The alignment step further includes a first calculation step of calculating a shift amount of the photoelectric conversion element 6 in the sub scanning direction from a maximum reference value selected from among the contrast values obtained at the plurality of positions. Still further, the alignment step includes a second calculation step of calculating at least one of an alignment angle and an alignment shift amount of the imaging optical system 5 in the sub scanning direction from the shift amount of the photoelectric conversion element 6, and a posture alignment step of aligning the posture of the imaging optical system based on the alignment angle or the alignment shift amount.

Figure 5:
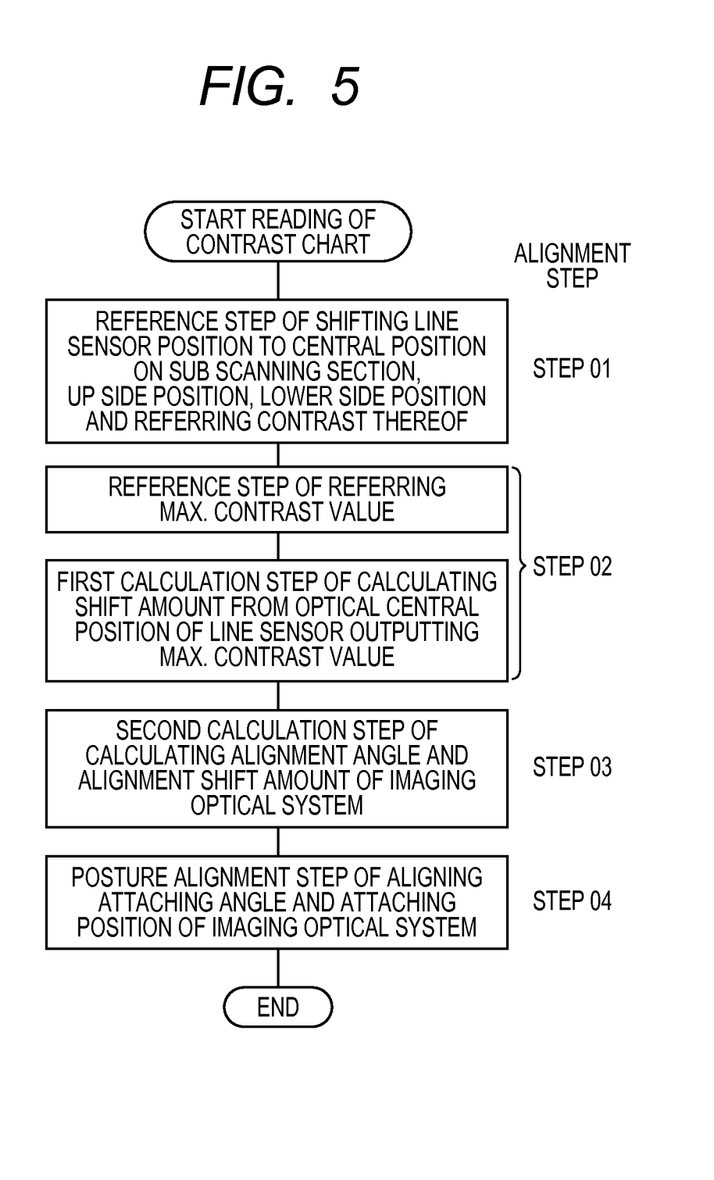
FIG. 5 is a flow chart of an alignment step according to the first embodiment of the present invention.

FIG. 5 is a flow chart of the alignment method for the imaging optical system according to this embodiment. In this embodiment, a contrast chart placed on the original table 2 is imaged onto the reading unit 6, to thereby detect the contrast of the chart image. First, a contrast chart is placed on the original table glass 2, and the imaging optical system 5 is used for imaging the contrast chart at a first reading position (optical central position on a sub scanning section) 6-1 of the line sensor 6, to thereby read the contrast of the chart image.

Figure 6:
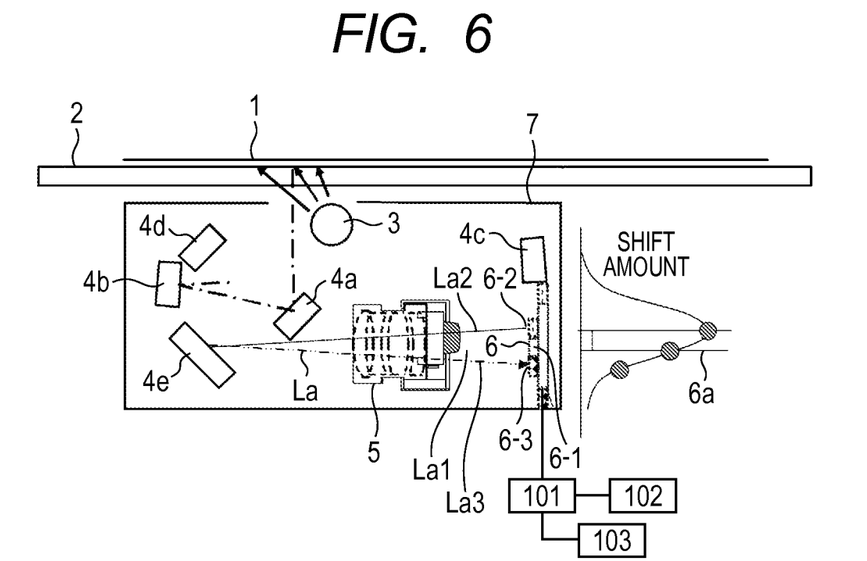
FIG. 6 is a main portion schematic diagram of the image reading apparatus using an alignment method according to the first embodiment of the present invention.

Subsequently, the line sensor 6 is moved to a second reading position (upper side position (one side position) of the sub scanning section with respect to the optical axis La) 6-2, and the contrast of the chart image is read in the same manner. Subsequently, the line sensor 6 is moved to a third reading position (lower side position (other side position) of the sub scanning section with respect to the optical axis La) 6-3, and the contrast of the chart image is read in the same manner. As a result, reading optical paths La1, La2, and La3 and contrast values of the chart image in the respective cases as illustrated in FIG. 6 are referred to (reference step) (Step 1). In this embodiment, three reading positions are provided but the number of reading positions is not limited thereto. More than three positions may be provided as long as at least three positions are provided so that the upper and lower positions sandwich the central position of the optical axis La on the sub scanning section of the line sensor 6.

A maximum contrast value (MAX contrast value) is selected from among the contrast values obtained at the plurality of reading positions (reference step), and a sub scanning shift amount from the central position of the optical axis La on the line sensor 6 outputting the maximum contrast value Max is calculated (first calculation step) (Step 2). The first calculation step allows confirmation of the position of the line sensor 6 in the sub scanning direction at which the maximum contrast value is obtained.

Subsequently, an arithmetic operation unit 103 or the PC 102 calculates an alignment angle or an alignment shift amount of the imaging optical system 5 in the sub scanning direction from the moving amount of the line sensor 6 (second calculation step; see FIG. 6) (Step 3). At this time, the method of alignment to be achieved only by driving of the line sensor 6 involves matters of alignment to be achieved in the line sensor 6, such as alignment of projection magnification and focusing, and hence it is highly difficult to perform the alignment along with those alignment matters. Therefore, in the alignment method of this embodiment, the alignment is performed only in the imaging optical system 5 of low sensitivity, that is, the attaching angle or the attaching position is aligned (posture alignment step), which leads to simplification of the alignment. Further, the alignment angle and the shift amount may be derived easily from the amount of movement of the line sensor 6 to the plurality of positions in the sub scanning direction, and the distance between the imaging optical system 5 and the line sensor 6. Then, the posture of the imaging optical system 5 is aligned based on the result of calculation of the alignment angle or the alignment shift amount (posture alignment step) (Step 4).

Figure 7:
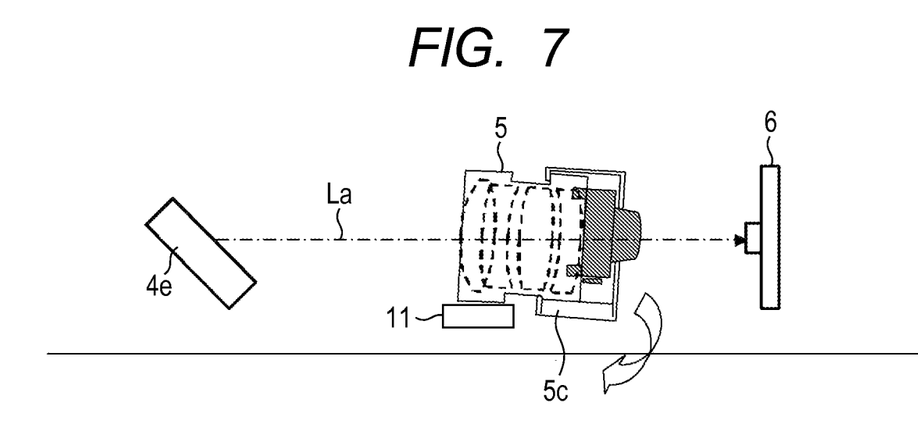
FIG. 7 is a main portion schematic diagram of the imaging optical system and a reading unit according to the first embodiment of the present invention.

For example, in the case where the angle of the imaging optical system 5 is aligned, as illustrated in FIG. 7, a spacer member (alignment unit) 11 is provided on a front side or a rear side of the lens barrel 5c of the imaging optical system 5 as viewed in the direction of the optical axis La. A plurality of thicknesses of the spacer member 11 are prepared so as to be adapted to the measurement positions of the contrast of the chart image. In the case of alignment using the shift amount, on the other hand, the spacer members (alignment units) 11 are provided on both the front and rear sides of the lens barrel 5c.

In this embodiment, in a case where a fitting backlash of 30 µm has occurred between the lens barrel 5c and the anamorphic lens 5b in the sub scanning direction, to perform correction for the fitting backlash, the spacer member 11 having a thickness of 0.3 mm to 0.5 mm only needs to be used for inclining the imaging optical system 5. Through the above-mentioned procedure, the attaching angle or the attaching position of the imaging optical system 5 in the sub scanning direction may be aligned (inclination alignment or shift alignment may be performed).

Second Embodiment

Figure 8:
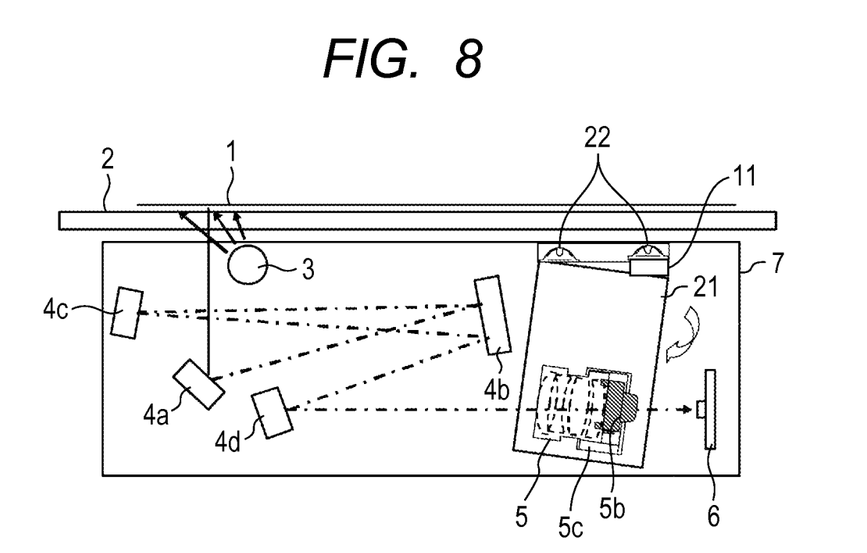
FIG. 8 is a main portion schematic diagram of an image reading apparatus using an alignment method for an image reading apparatus according to a second embodiment of the present invention.

FIG. 8 is a main portion schematic diagram of an image reading apparatus using an alignment method for an image reading apparatus according to a second embodiment of the present invention. In FIG. 8, the same components as those illustrated in FIGS. 3A to 7 are represented by the same reference symbols. In FIG. 8, the image reading apparatus includes a separate member unit 21 including the imaging optical system 5. This embodiment is different from the first embodiment in that, as illustrated in FIG. 8, the imaging optical system 5 is integrated into the separate member unit 21 having fitting portions with the integrated scanning optical system unit 7 and the separate member unit 21 is attached to the integrated scanning optical system unit 7.

In FIG. 8, the imaging optical system 5 is attached to an inner portion of the separate member unit 21 having two fitting portions 22 provided in an upper portion thereof, by means of springs, screws, and an adhesive. The separate member unit 21, to which the imaging optical system 5 is attached, is attached to the integrated scanning optical system unit 7 by means of the fitting portions and screws. Steps of the alignment method for the imaging optical system 5 are the same as those in the first embodiment.

In this embodiment, in the case where the angle is aligned, as illustrated in FIG. 8, the spacer member (alignment unit) 11 is provided to any one of the two fitting portions 22 of the separate member unit 21, and the separate member unit 21 is screwed and attached to the integrated scanning optical system unit 7 through the intermediation of the spacer member 11. A plurality of thicknesses of the spacer member 11 are prepared so as to be adapted to the values of the measurement positions of the contrast. In the case of alignment using the shift amount, on the other hand, the spacer members 11 are provided to both the two fitting portions 22, and the separate member unit 21 is attached to the integrated scanning optical system unit 7.

Also in this embodiment, it is assumed that a fitting backlash of 30 µm has occurred between the lens barrel 5c and the anamorphic lens 5b in the sub scanning direction. In this case, to perform correction for the fitting backlash, the spacer member 11 having a thickness of 0.3 mm to 0.5 mm may be used for inclining the separate member unit 21 relative to the integrated scanning optical system unit 7. According to the embodiments of the present invention, through the above-mentioned procedure, the attaching angle or the attaching position of the imaging optical system 5 in the sub scanning direction may be aligned. In addition, the alignment method for the imaging optical system according to the present invention is not limited to the above-mentioned embodiments, and various modifications may be made thereto without departing from the gist of the present invention.

As described above, according to the embodiments of the present invention, in the imaging optical system having the optical surface that is rotationally asymmetric about the optical axis, even in the case where the rotationally asymmetric optical surface is displaced in the sub scanning direction, the imaging optical system of low sensitivity itself may be aligned. Accordingly, the image reading apparatus which allows the alignment to be performed with high accuracy and thus allows the image information to be read with high accuracy is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-113170, filed May 17, 2010, which is hereby incorporated by reference herein in its entirety.

What is claimed is:

1. An alignment method for an image reading apparatus comprising:
   a light source unit, which emits a light beam for illuminating an original placed on an original table;
   a photoelectric conversion element, in which a plurality of reading pixels are arrayed in a main scanning direction so as to convert an optical image into an electric signal; and
   an imaging optical system for imaging, onto the photoelectric conversion element, the light beam from the original that is illuminated by the light beam emitted from the light source unit,
   the imaging optical system comprising:
      a first optical element, which is arranged inside a first lens barrel, and has an optical surface that is rotationally symmetric about an optical axis; and
      a second optical element, which is arranged on an optical path between the first lens barrel and the photoelectric conversion element, and has an optical surface that is rotationally asymmetric about the optical axis,
   the alignment method comprising an alignment step of aligning at least one of an attaching angle and an attaching position of the second optical element in a sub scanning direction relative to the first lens barrel.

2. An alignment method for an image reading apparatus according to claim 1, wherein the alignment step comprises:
- a reference step of moving the photoelectric conversion element to a plurality of positions in the sub scanning direction, and referring to contrast values of image information of the original obtained by the photoelectric conversion element at the plurality of positions;
- a first calculation step of calculating a shift amount of the photoelectric conversion element in the sub scanning direction from a maximum reference value selected from among the contrast values obtained at the plurality of positions;
- a second calculation step of calculating at least one of an alignment angle and an alignment shift amount of the second optical element in the sub scanning direction from the shift amount of the photoelectric conversion element; and
- an attachment step of aligning the at least one of the attaching angle and the attaching position of the second optical element in the sub scanning direction relative to the first lens barrel based on the at least one of the alignment angle and the alignment shift amount of the second optical element in the sub scanning direction.

3. An alignment method for an image reading apparatus according to claim 1, wherein the reference step of moving the photoelectric conversion element to a plurality of positions in the sub scanning direction, and referring to contrast values of image information of the original obtained by the photoelectric conversion element at the plurality of positions comprises moving the photoelectric conversion element to at least three positions on a sub scanning section, which are an optical central position of the imaging optical system, one side position with respect to the optical central position of the imaging optical system, and another side position with respect to the optical central position of the imaging optical system.

4. An alignment method for an image reading apparatus according to claim 1, further comprising reading image information of the original by moving, in the sub scanning direction, an integrated scanning optical system unit comprising a carriage, which houses the light source unit, the photoelectric conversion element, and the imaging optical system.

5. An alignment method for an image reading apparatus according to claim 1, wherein the alignment step comprises an attachment step of aligning at least one of an attaching angle and an attaching position of a second lens barrel, which holds the second optical element, in the sub scanning direction relative to the first lens barrel.

6. An alignment method for an image reading apparatus according to claim 1, wherein the alignment step comprises an attachment step of aligning at least one of an attaching angle and an attaching position of the integrated scanning optical system unit in the sub scanning direction relative to the image reading apparatus.

7. An image reading apparatus, which is subjected to alignment using the alignment method for an image reading apparatus according to claim 1.

* * * * *